United States Patent [19]

Maycock et al.

[11] 4,144,666
[45] Mar. 20, 1979

[54] FISHING BOBBER HAVING LINE RETAINING RING

[76] Inventors: E. Frank Maycock, 5332 Newport, Omaha, Nebr. 68152; Donald J. Orr, Box 27, Arnolds Park, Iowa 51331

[21] Appl. No.: 769,121

[22] Filed: Feb. 16, 1977

[51] Int. Cl.² .............................................. A01K 93/00
[52] U.S. Cl. ................................................... 43/44.95
[58] Field of Search .................. 43/44.92, 44.95, 44.93, 43/44.94, 44.87; 24/261

[56] References Cited

U.S. PATENT DOCUMENTS

| | | | |
|---|---|---|---|
| 3,557,486 | 1/1971 | Wright | 43/44.95 X |
| 3,800,459 | 4/1974 | Fleischaker | 43/44.9 |

FOREIGN PATENT DOCUMENTS 1122363  9/1956  France.

*Primary Examiner*—Ronald E. Suter
*Attorney, Agent, or Firm*—Henderson & Sturm

[57] ABSTRACT

A fishing float having a retaining ring resiliently biased into contact with the circumferential surface thereof is disclosed. The retaining ring is shaped substantially the same as the circumference of the float and is removably engaged therewith. Alternatively, the retaining ring may include one or more offsets through which a fishing line may freely move. The retaining ring has two free spaced apart ends forming an opening therebetween, with each of the free ends bent to form a guide means thereon for directing a line between the retaining ring and the body of the float. A removable element may be employed to firmly lock the free ends of the retaining ring in fixed spaced relationship.

4 Claims, 7 Drawing Figures

FISHING BOBBER HAVING LINE RETAINING RING

BACKGROUND OF THE INVENTION

This invention relates generally to fishing equipment, and specifically to a fishing float with novel means associated therewith for maintaining a selected positional relationship between the float and a fishing line.

Fishing, as a sport and vocation, has developed in modern times into an art employing innumerable and varying techniques and pieces of peripheral equipment. The complexity of the technology ranges from the simple line and sinker to sophisticated electronic fish hunting and spotting devices. In spite of the large amounts of research dollars spent yearly in the development of exotic fishing equipment, the most practical and useful advances are generally found to result in the simplification of low technology hardware. It is this latter category into which the fishing float of the instant invention belongs.

Fishing floats were, without a doubt, some of the first peripherals developed in the advancement of the fishing art. Furthermore, without exception, every sport fisherman will have at least one, and usually more, fishing float in his tackle box. The styles of floats available are numerous, as are the methods by which the fishing line is affixed thereto.

The earliest, and most crude, fishing floats were made of wood or cork with the line tied thereto to allow the bait to assume the selected depth. This type of device has many short comings including an inability to easily change depths and a high likelyhood of damaging or breaking the fishing line.

More modern fishing floats are generally made of plastic and have various mechanical means associated therewith for affixing the fishing line thereto. The most common float seen today is of a spherical shape with a spring mechanism and clip for affixment to a line. One problem with such a device is that the line has a tendency to slip through the clip, especially during casting, and thus change the depth of the bait. Sometimes, also, the clip is so tight as to weaken the line. Other fixing techniques have been employed in the past, such as, for example, wrapping the line through a spring, but these too have met with limited acceptance for one reason or another.

As alluded to above, the most well-known prior art fishing floats are not, as might be expected, simple devices. The assembly of springs, rods, buttons, etc. which make the float readily affixable to a line is difficult and costly. The invention described herein eliminates this complex hardware and significantly reduces the overall cost of manufacture.

BRIEF SUMMARY OF THE INVENTION

It is therefore an object of this invention to provide a fishing float which overcomes the above-mentioned deficiencies of the prior art.

It is another object of this invention to provide a fishing float which is durable of construction, economical of manufacture, and extremely effective in use.

It is another object of this invention to provide a fishing float which may be securely affixed to a line without cutting or otherwise damaging the line.

It is another object of this invention to provide a fishing float which is selectively usable as a slip float or a fixed position float.

It is another object of this invention to provide a fishing float which employs a retaining ring with guide means thereon for directing a line between the retaining ring and the body of the float for secure attachment.

It is another object of this invention to provide a fishing float which will have a positive grip on the fishing line without weakening or injuring it.

It is another object of this invention to provide a fishing float which may be attached quickly and easily to the line without a need for tying.

It is another object of this invention to provide a fishing float which may be quickly and easily moved from one position on the line to another, as the depth may require.

It is a further object of this invention to provide a fishing float which has means thereon to co-act with a resilient retaining ring to maintain the ring in a selected location on the float.

It is a still further object of this invention to provide a fishing float which has means on the end thereof to co-act with a retaining ring to hold a line in fixed position relative to the float.

The foregoing objects and others are obtained according to the instant invention by providing a fishing float having a retaining ring resiliently biased into contact with the circumferential surface thereof. The retaining ring is shaped substantially the same as the circumference of the float and is removable engaged therewith. The retaining ring has two free spaced apart ends forming an opening therebetween, with each of the free ends including guide means thereon for directing a line between the retaining ring and the body of the float.

BRIEF DESCRIPTION OF THE DRAWINGS

For a better understanding of the invention as well as other objects and further features thereof, reference is made to the following detailed disclosure of the invention taken in conjunction with the accompanying drawings wherein.

DESCRIPTION OF THE PREFERRED EMBODIMENTS

Generally speaking, the invention to be described below comprises a fishing float which includes a main body element and a retaining ring which is resiliently urged into contact with a main body element. The fishing float is affixed to a line by, in its simplest form, passing the line between the main body element and the retaining ring where its position is maintained by the forces existing between the resilient ring and the main body element.

Figure 1:
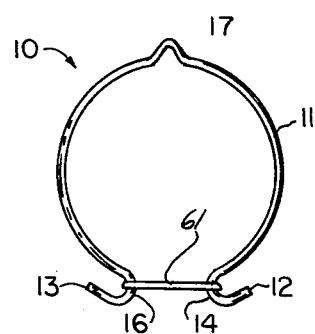
FIG. 1 is a front plan view of a retaining ring made according to the instant invention.
Figure 5:
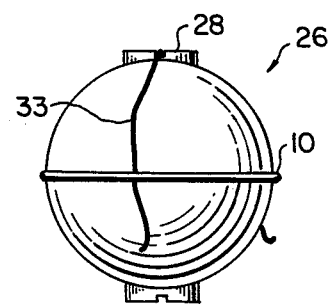
FIG. 5 is a perspective view of the fishing float body of FIGS. 3 and 4 with the retaining ring of FIG. 1 affixed thereto.

Referring now to FIG. 1, one embodiment of the retaining ring can be seen. The ring 10 is comprised of a resilient wire 11 which is formed generally into the shape of a circle. The two free ends 12 and 13 are bent substantially back onto themselves to form generally curved portions 14 and 16 which serve to guide a line into the interior portion of the ring. Of course, when the ring is affixed to a main body of a float, as shown in FIG. 5, the line will be guided into a position between the ring 10 and the main body of the float. It is generally contemplated that the curved portions 14 and 16 will be spaced apart to provide a gap to make the insertion of a line more simple. The ring 10 is shown to also include an offset 17 which, when affixed to the main body of the float, is open, i.e., not in contact with the main body. The offset 17 allows the line to be moved around the ring 10 to fit into the opening, and thus provide a slip float. A slip float is useful to many fishermen who prefer to hold the line at a specific depth or location until a fish strikes the bait, at which time the fish may run with the line and not be retarded from his motion by the float. Slip floats are also useful in giving a natural appearance to live bait.

Figure 2:
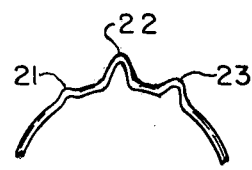
FIG. 2 is a partial view of a modification of the retaining ring of FIG. 1.

FIG. 2 is a partial view of a retaining ring similar to that of FIG. 1 except that it shows several offset 21, 22 and 23 of varying sizes. Since a single fishing float is very often used on different sizes of fishing line, it is advantageous to have offsets of varying sizes to accomodate the different lines.

While it is preferred that retaining ring 10 be made of wire-like resilient material, any suitable similar construction may be used. For example, many plastics can be easily formed into resilient rings which would serve in an equivalent manner. Also, it should be readily understood that the retaining ring need not be wire-like, but could also be in the shape of a circular band having a width several times the diameter of the wire shown.

Figure 3:
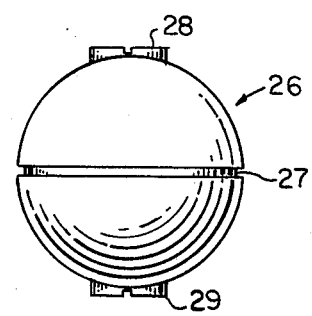
FIG. 3 is a side elevational view of one embodiment of a fishing float body usable with the retaining ring of FIG. 1.

FIG. 3 shows an embodiment of a main body element suitable for use with the retaining ring described immediately above. Main element 26 comprises a generally spherical floatation body having a centrally located slot 27 around the entire periphery thereof. The slot 27 is a means for holding the retaining ring in a fixed position relative to the main body. The holding means is very advantageous, especially when the main body element is spherical or has sloping exterior surfaces. It is, however, contemplated that such holding means will not be necessary if the sides of the main body are substantially straight, or if the retaining ring is itself wide with an interior curved surface substantially equivalent to that of the main body.

The FIG. 3 embodiment further includes identical collar guides 28 and 29 on opposing sides thereof. Collar guide 28 can best be seen in the top plan view of FIG. 4. Guide 28 includes regularly spaced slots 30-32, and 35 through which, as will be explained below with reference to FIG. 5, a line may be passed to aid in the securement of the line to the float.

Figure 4:
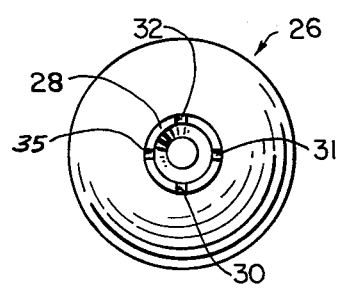
FIG. 4 is a top plan view of the fishing float body of FIG. 3.

FIG. 5 shows the main body section 26 of FIGS. 3 and 4 with the retaining ring 10 affixed thereto in the slot 27. To affix a line to the float, one merely passes the line through the gap along guide 16 and pulls it around to the side of the float. More secure affixment can be maintained by then passing a line such as 33 across the top of the main body section through two opposing slots, for example 30 and 32, in guide collar 28 and down through the opposite guide 14 and back along the side of the main body section. Thus, the line is affixed on two sides of the main body section.

Figure 6:
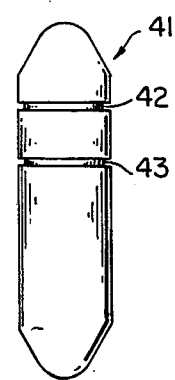
FIG. 6 is another embodiment of a fishing float body suitable for use with the instant invention.

FIG. 6 shows an alternative main body section 41 which is elongate and includes two grooves around the periphery thereof 42 and 43. With this embodiment multiple retainer rings may be affixed to the main body section to increase the affixment of the line to the float.

Figure 7:
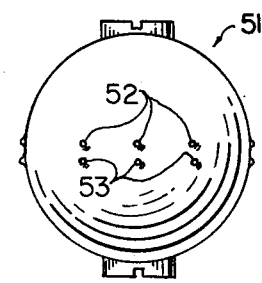
FIG. 7 is yet another embodiment of a fishing float body suitable for use with the instant invention.

FIG. 7 shows an even still further modification 51 of the main body section of the float. A spherical element having two lines of protrusions 52 and 53 thereon circumferentially around the exterior thereof. The protrusions form a holding means equivalent to slot 27 for the retaining ring which would be positioned between the two rows.

Under certain circumstances, for example when relatively heavy weights are employed or under certain casting conditions, it may be found very beneficial to substantially lock the free ends of the retaining ring together. The problem encountered under these, and similar, conditions is that the ring may become disengaged with the main body of the float. By referring to FIG. 1, it can be seen that the free ends of the retaining ring 10 may be easily fixed together by controlling the gap between guides 14 and 16. Any suitable locking means may be employed, such as, for example, a rubber band 61, a length of string, a spring or a snap ring.

It will be understood that various changes in the details, materials, steps and arrangements of parts, which have herein been described and illustrated in order to explain the nature of the invention, will occur to and may be made by those skilled in the art upon a reading of the disclosure within the principles and scope of the invention.

For example, the above disclosure is limited primarily to floats with circular cross sections. The concepts of the instant invention are equally applicable to other configurations such as rectangular and ellipsoidal.

We claim:

1. A fishing float comprising:
   (a) a main body element which floats substantially at or near the surface of water, said main body element having a length and circumferential surface, said main body element being at least partially circular in cross section and wherein said circular cross sectional portion of said main body element includes holding means thereon, and wherein said holding means comprises two linearly aligned arrays of surface protrusions extending around said circular cross sectional portion of said main body element, said two arrays being spaced away from each other along the length of said main body element; and
   (b) a retaining ring resiliently urged into contact with a portion of said circumferential surface of said main body, said retaining ring having two free spaced apart ends forming a gap therebetween, each of said free ends including guide means thereon for directing a line between said main body and said retaining ring, and wherein said retaining ring is in contact with said circular cross sectional portion of said main body element, and wherein said main body element holding means coacts with said retaining ring to maintain its location relative to the length of said main body element, and wherein said two arrays being spaced away from each other along the length of said main body element a distance slightly larger than the thickness of said retaining ring.

2. A fishing float comprising:
(a) a main body element which floats substantially at or near the surface of water, said main body element having a length and a circumferential surface, said main body element is at least partially circular in cross section and wherein said circular cross sectional portion of said main body element includes holding means thereon and wherein said holding means comprises a slot formed at least part way around said circular cross section portion of main body element and wherein said main body element is substantially spherical; and
(b) a retaining ring resiliently urged into contact with a portion of said circumferential surface of said main body, said retaining ring having two free spaced ends forming a gap therebetween, each of said free ends including guide means thereon for directing a line between said main body and said retaining ring and wherein said retaining ring is in contact with said circular cross sectional portion of said main body element and wherein said retaining ring coacts with said holding means to maintain its location relative to the length of said main body element and wherein said retaining ring has at least one off-set portion which does not contact said main body element thereby forming an opening bounded by said retaining ring and said main body element and wherein said slot in said main body element extends around the area of maximum diameter of said main body element, and further including a pair of opposing collars affixed to, and extending away from said main body element, the axis between said collars being substantially perpendicular to the plane of said slot, each of said collars including guide grooves therein across the top thereof.

3. The fishing float of claim 2 wherein said retaining ring comprises wire.

4. The fishing float of claim 2 wherein said retaining ring comprises plastic.

* * * * *